United States Patent Office 3,654,303
Patented Apr. 4, 1972

3,654,303
5-BROMO-4-OXO-4,5,6,7-TETRAHYDROINDOLES
AND METHODS OF PREPARING SAME
William Alan Remers, Suffern, N.Y., and Martin Joseph
Weiss, Oradell, N.J., assignors to American Cyanamid
Company, Stamford, Conn.
No Drawing. Filed Jan. 6, 1970, Ser. No. 1,043
Int. Cl. C07d 27/54
U.S. Cl. 260—326.12 R          7 Claims

ABSTRACT OF THE DISCLOSURE

This disclosure describes compounds of the class of 5-bromo-4-oxo-4,5,6,7 - tetrahydroindoles useful as antifungal agents.

BRIEF SUMMARY OF THE INVENTION

This invention relates to new organic compounds and, more particularly, is concerned with novel 5-bromo-4-oxo-4,5,6,7-tetrahydroindoles and with methods of preparing these compounds. The novel compounds of the present invention may be represented by the following general formula:

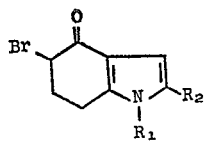

wherein $R_1$ is hydrogen, benzoyl or benzenesulfonyl and $R_2$ is hydrogen, nitro or lower alkanoyl with the proviso that $R_1$ is hydrogen when $R_2$ is nitro or lower alkanoyl. Suitable lower alkanoyl groups contemplated by the present invention are those having from two to four carbon atoms such as, for example, acetyl, propionyl, butyryl, isobutyryl, etc.

DETAILED DESCRIPTION OF THE INVENTION

The novel compounds of the present invention are generally obtainable as white to pale yellow crystalline materials having characteristic melting points and absorption spectra and which may be purified by recrystallization from lower alkanols or mixtures of tetrahydrofuran and hexane. They are appreciably soluble in many organic solvents such as methylene chloride, chloroform, dimethylformamide, and the like but are relatively insoluble in water.

The novel compounds of the present invention may be readily prepared by the bromination of a compound of the formula:

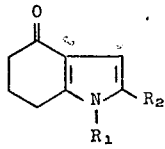

wherein $R_1$ and $R_2$ are as hereinbefore defined. This bromination may be readily accomplished by treating an appropriately substituted 4-oxo-4,5,6,7-tetrahydroindole with pyridinium bromide perbromide or phenyltrimethylammonium tribromide in tetrahydrofuran as solvent at room temperature for a period of a few hours. The product may be isolated by filtering the reaction mixture, concentrating the filtrate, and recrystallizing the residue.

The novel compounds of the present invention are useful as antifungal agents and possess broad-spectrum antifungal activity in vitro against a variety of standard laboratory micro-organisms as determined by the agar-dilution streak-plate technique. In this assay, the compounds to be tested are made up to contain 2.5 mg. of test compound per milliliter of solution. Observing sterile techniques, two-fold serial dilutions are made of each test solution. One milliliter of each of the original solutions and of each of the serial dilutions is then added to 9 ml of warm sterile nutrient agar capable of supporting growth of the fungal test cultures. The standard sterile nutrient agar solutions containing the different dilutions of the test compounds, along with suitable and comparable control dilutions containing no test compound, are then allowed to cool in Petri dishes thereby forming solidified agar plates. The test yeast-like fungi are prepared for use by growing in broth overnight. The spores of the filamentous fungi are harvested from mature agar slant cultures and are suspended in sterile physiological saline solution. A loopful of each of the resulting live suspensions is then, still employing sterile techniques, streaked upon the surfaces of each of the agar plates and the resulting streaked plates are then incubated. After an appropriate period of time, each of the streaks on each of the plates is inspected visually and the extent, if any, of fungal growth is noted. The minimal inhibitory concentration (expressed in micrograms per milliliter) is defined as the concentration of test compound causing complete inhibition of growth of any particular organism.

The standard laboratory microorganisms employed in the above-described assay were the following:

(1) *Microsporum canis* ATCC 10214
(2) *Microsporum gypseum* ATCC 14683
(3) *Trichophyton tonsurans* NIH 662
(4) *Trichophyton mentagrophytes* (E 11)
(5) *Trichophyton rubrum* (E 97)

In a representative operation, and merely by way of illustration, the minimal inhibitory concentration of typical compounds of this invention against the above test organisms as determined in the above-described assay are set forth in Table I below:

TABLE I.—IN VITRO ANTIFUNGAL ACTIVITIES
[Minimal inhibitory conc. (mcg./ml.)]

| Compound | Fungi | | | | |
|---|---|---|---|---|---|
| | (1) | (2) | (3) | (4) | (5) |
| 1-benzenesulfonyl-5-bromo-4-oxo-4,5,6,7-tetrahydroindole | 2.5 | 10 | 5 | | 10 |
| 1-benzoyl-5-bromo-4-oxo-4,5,6,7-tetrahydroindole | 5 | 50 | 25 | 25 | |
| 5-bromo-4-oxo-4,5,6,7-tetrahydroindole | 10 | 100 | 25 | 25 | 50 |
| 5-bromo-2-nitro-4-oxo-4,5,6,7-tetrahydroindole | 16 | 250 | 62 | 62 | 62 |
| 5-bromo-2-acetyl-4-oxo-4,5,6,7-tetrahydroindole | 10 | 50 | 25 | 25 | 25 |

As antifungals, the compounds of this invention may be administered orally or parenterally in the usual pharmaceutical forms, or possibly in the diet, and/or as compositions of active ingredient in an edible carrier. Such compositions may include tablets, scored or unscored, or hard or soft shell capsules. Excipients may include lactose, starch, buffers, disintegrating agents, lubricants, homogenizing agents, and the like. Oral and parenteral compositions may include similar agents and also preservatives, emulsifiers, surfactants, stabilizers and the like in solutions, suspensions, syrups, elixirs, etc. in either aqueous or non-aqueous systems. Additional excipients might include sweeteners, flavorings, colorings, or perfumes. Topical preparations, it is expected, will prove particularly useful. Such compositions would be designed for administration to subjects exposed to, or infected with sensitive fungi for either treatment or prophylaxis and may include, in addition to the foregoing, ointments, creams, emulsions, unguents, salves, emolients, sprays, washes or the like. In addition, compounds of this invention may be used in the form of solutions, suspensions, emulsions, washes, powders, dusts, mists, soaps, sprays, aerosols, drenches, or other forms for the purpose of cleaning, disinfecting, or sterilizing surgical instruments, laboratory glassware or instruments, hospital walls or other surfaces, linens, dishes, laboratory tables, coops, cages, or the like. Likewise these compounds might be incorporated into soaps, detergents, sprays or the like in the home, farm, office or elsewhere with the purpose of preventing or minimizing infection or contamination with sensitive fungi. Painting, spraying, immersion or other means of effecting contact may be applied.

The 2 - nitro - 4 - oxo-4,5,6,7-tetrahydroindole and 2 - (lower alkanoyl) - 4 - oxo-4,5,6,7-tetrahydroindoles are also new compounds and are useful as intermediates for the preparation of certain of the compounds of the present invention. The 2-(lower alkanoyl)-4-oxo-4,5,6,7-tetrahydroindoles are generally obtainable as white to pale yellow crystalline materials having characteristic melting points and absorption spectra and which may be purified by recrystallization from water or lower alkanols or mixtures thereof. They are appreciably soluble in many organic solvents such as acetone, chloroform, dimethylformamide, and the like but are sparingly soluble in water.

The 2 - (lower alkanoyl) - 4 - oxo - 4,5,6,7-tetrahydroindoles may be readily prepared from 4 - oxo - 4,5,6,7-tetrahydroindole by treatment with a lower alkanoic anhydride in the presence of 70% perchloric acid. The reaction is best carried out in an excess of the lower alkanoic anhydride as solvent at a temperature of 0°–10° C. for a period of time of about 15 minutes to about half an hour. The reaction mixture is then warmed to room temperature and poured into water whereupon the corresponding 2-lower alkanoyl derivative of 4-oxo-4,5,6,7-tetrahydroindole separates from the solution.

The 2 - (lower alkanoyl)-4-oxo-4,5,6,7-tetrahydroindoles possess anti-inflammatory properties as determined by the carrageenin-induced rat paw edema test as follows. In this test weanling Sherman strain rats ranging in weight from 50–55 grams are used and fed standard laboratory diet ad libitum. The test compound is administered to the rats by gavage (250 milligrams per kilogram in a volume of 1.7 milliliters of buffered aqueous starch) one hour prior to challenge with carrageenin. The challenge agent, carrageenin, is obtained from Marine Colloids, 2 Edison Place, Springfield, N.J., and prepared as a sterile 1% suspension in 0.09% aqueous sodium chloride. A volume of 0.05 milliliter is injected using a 26-gauge needle into the plantar tissue of the right hind paw of treated and untreated rats. Measurements of the volumes of the carrageenin inflamed right (challenged) paw and left (unchallenged) paw are determined 4 hours subsequent to the carrageenin challenge. The method of determining paw volumes is carried out essentially as described by C. A. Winter et al. in Proc. Soc. Exptl. Biol. Med. 111: 544–547 (1962) using mercury immersion. The differences in volume between the two paws of each rat is considered to be the volume of the carrageenin induced edema. The mean edema volume of eight control rats divided by the mean edema volume of two treated rats is calculated and designated the $C/T$ efficacy ratio. A compound is considered active in this test if the mean $C/T$ efficacy ratio of 2 consecutive tests is equal to or greater than 1.43. In a representative operation, and merely by way of illustration, the mean $C/T$ efficacy ratio (four rats) of 2 - acetyl-4-oxo-4,5,6,7,-tetrahydroindole in the above-described test was 2.14.

The invention will be described in greater detail in conjunction with the following specific examples.

EXAMPLE 1

Preparation of 1-benzenesulfonyl-4-oxo-4,5,6,7-tetrahydroindole

A mixture of 5.6 g. of potassium t-butoxide, 6.25 g. of 4-oxo-4,5,6,7-tetrahydroindole [Ann. Chem. 655, 20 (1962)] and 200 ml. of benzene is heated at reflux temperature for 2 hours, cooled, and treated with a solution of 8.83 g. of benzenesulfonyl chloride in 20 ml. of benzene. The mixture is stirred 16 hours at room temperature and treated with water. The organic layer is washed with 2% sodium bicarbonate solution, dried and concentrated. Recrystallization of the residue from methanol gives 5.12 g. of white rods, M.P. 117–118.5° C.

EXAMPLE 2

Preparation of 1-benzenesulfonyl-5-bromo-4-oxo-4,5,6,7-tetrahydroindole

This compound is prepared by the procedure described in Example 4. From 550 mg. of 1-benzenesulfonyl-4-oxo-4,5,6,7-tetrahydroindole is obtained 416 mg. of the desired product, which has M.P. 94–96° C. after recrystallization from tetrahydrofuran-hexane.

EXAMPLE 3

Preparation of 1-benzoyl-4-oxo-4,5,6,7-tetrahydroindole

A mixture of 13.5 g. of 4-oxo-4,5,6,7-tetrahydroindole [Ann. Chem. 655, 20 (1962)], 11.2 g. of sublimed potassium t-butoxide and 200 ml. of benzene is stirred at reflux temperature for one hour, cooled, and treated with a solution of 14.0 g. of benzoyl chloride in 25 ml. of benzene. The resulting mixture is stirred for 2 hours and then treated with 200 ml. of water and 150 ml. of methylene chloride. The organic layer is washed with 5% sodium bicarbonate solution, dried and concentrated. Recrystallization of the residue from acetone-hexane gives 15.0 g. of product as colorless prisms, M.P. 122–124° C.

EXAMPLE 4

Preparation of 1-benzoyl-5-bromo-4-oxo-4,5,6,7-tetrahydroindole

A solution of 11.95 g. of 1-benzoyl-4-oxo-4,5,6,7-tetrahydroindole in 150 ml. of tetrahydrofuran is treated portionwise with a solution of 16.0 g. of pyridinium bromide perbromide in 50 ml. of tetrahydrofuran. After 2 hours the resulting mixture is filtered and the filtrate is concentrated under reduced pressure. The residue is dissolved in methylene chloride and washed with 5% sodium bicarbonate solution. Concentration of the organic layer affords the product as a crystalline solid, which after washing with ether and two recrystallizations from tetrahydrofuran-hexane has melting point 148–149° C.

EXAMPLE 5

Preparation of 5-bromo-4-oxo-4,5,6,7-tetrahydroindole

A suspension of 636 mg. of 1-benzoyl-5-bromo-4-oxo-4,5,6,7-tetrahydroindole in 15 ml. of methanol is treated with 0.4 ml. of 5 N sodium hydroxide. After one hour the resulting solution is neutralized with hydrochloric acid and concentrated to dryness. The residue is treated with $CH_2Cl_2$ and 5% sodium bicarbonate solution. The organic layer is dried and concentrated, affording 397 mg. of the desired product as white crystals that have melting point 170–173° C. after two recrystallizations from methanol.

EXAMPLE 6

Preparation of 2-nitro-4-oxo-4,5,6,7-tetrahydroindole

A mixture of 540 mg. of 4-oxo-4,5,6,7-tetrahydroindole and 3 ml. of concentrated sulfuric acid is cooled in an ice-salt bath and treated portionwise with a solution of 340 mg. of sodium nitrate in 3 ml. of concentrated sulfuric acid. The mixture is stirred for 10 minutes more and poured onto ice whereupon the product separates as tan crystals. Recrystallization from methanol-water gives tan needles, M.P. 271–272° C. (decomposition).

EXAMPLE 7

Preparation of 5-bromo-2-nitro-4-oxo-4,5,6,7-tetrahydroindole

This compound is prepared by the procedure described in Example 4 except that phenyltrimethylammonium tribromide is the brominating agent. From 900 mg. of 2-nitro-4-oxo-4,5,6,7-tetrahydroindole and 1.88 g. of phenyltrimethylammonium tribromide is obtained 1.18 g. of the desired product, which decomposes when heated above 190° C.

EXAMPLE 8

Preparation of 2-acetyl-4-oxo-4,5,6,7-tetrahydroindole

A suspension of 405 mg. of 4-oxo-4,5,6,7-tetrahydroindole [Ann. Chem. 655, 20 (1962)] in 10 ml. of acetic anhydride is treated with 0.43 ml. of 70% perchloric acid. The resulting orange solution is cooled in an ice bath, whereupon orange crystals form. These crystals are washed with acetic anhydride and with ether. They are then dissolved in water. Yellow crystals of product rapidly separate from this solution. Recrystallization from hot water gives yellow crystals, melting point 185°–188° C.

EXAMPLE 9

Preparation of 2-propionyl-4-oxo-4,5,6,7-tetrahydroindole

Following the general procedure of Example 8, 4-oxo-4,5,6,7-tetrahydroindole is treated with propionic anhydride in the presence of 70% perchloric acid to give the 2-propionyl-4-oxo-4,5,6,7-tetrahydroindole.

EXAMPLE 10

Preparation of 5-bromo--2-acetyl-4-oxo-4,5,6,7-tetrahydroindole

This compound is prepared by the procedure described in Example 4 except that phenyltrimethylammonium tribromide is the brominating agent. From 354 mg. of 2-acetyl-4-oxo-4,5,6,7-tetrahydroindole and 752 mg. of phenyltrimethylammonium tribromide is obtained a viscous oil. Resolution of this oil into its constituent compounds by liquid-liquid partition chromatography on diatomaceous earth with a solvent system consisting of heptane-ethyl acetate - methanol-water (70:30:17:4) affords the desired product as pale yellow solid; M.P. 157°–159° C. after recrystallization from methylene chloride-hexane.

EXAMPLE 11

Preparation of 5-bromo-2-propionyl-4-oxo-4,5,6,7-tetrahydroindole

Following the general procedure of Example 10, 2-propionyl-4-oxo-4,5,6,7-tetrahydroindole is treated with phenyltrimethylammonium tribromide to give the 5-bromo-2-propionyl-4-oxo-4,5,6,7-tetrahydroindole.

We claim:
1. Compounds which correspond to the general formula:

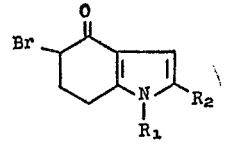

wherein $R_1$ is selected from the group consisting of hydrogen, benzoyl and benzenesulfonyl and $R_2$ is selected from the group consisting of hydrogen, nitro and lower alkanoyl with the proviso that when $R_2$ is nitro or lower alkanoyl then $R_1$ must be hydrogen.

2. A compound according to claim 1 wherein $R_1$ is hydrogen and $R_2$ is hydrogen.
3. A compound according to claim 1 wherein $R_1$ is benzoyl and $R_2$ is hydrogen.
4. A compound according to claim 1 wherein $R_1$ is benzensulfonyl and $R_2$ is hydrogen.
5. A compound according to claim 1 wherein $R_1$ is hydrogen and $R_2$ is nitro.
6. A compound according to claim 1 wherein $R_1$ is hydrogen and $R_2$ is acetyl.
7. A compound according to claim 1 wherein $R_1$ is hydrogen and $R_2$ is propionyl.

References Cited

UNITED STATES PATENTS 3,226,398   12/1965   Allen et al. _____ 260—326.16

ALEX MAZEL, Primary Examiner

J. A. NARCAVAGE, Assistant Examiner

U.S. Cl. X.R.

260—326.16; 424—274